United States Patent
Ekambaram et al.

(10) Patent No.: US 9,756,320 B2
(45) Date of Patent: Sep. 5, 2017

(54) MULTI-LAYER DISPLAY OF CONTENT ON A FLEXIBLE DISPLAY

(71) Applicant: INTERNATIONAL BUSINESS MACHINES CORPORATION, Armonk, NY (US)

(72) Inventors: Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 14/884,236

(22) Filed: Oct. 15, 2015

(65) Prior Publication Data

US 2017/0111634 A1 Apr. 20, 2017

(51) Int. Cl.
*H04N 13/04* (2006.01)
*G06F 1/16* (2006.01)
*G09G 3/00* (2006.01)
*G06F 3/0484* (2013.01)

(52) U.S. Cl.
CPC ....... *H04N 13/0495* (2013.01); *G06F 1/1652* (2013.01); *G06F 3/04842* (2013.01); *G09G 3/003* (2013.01); *H04N 13/0468* (2013.01); *G09G 2300/023* (2013.01)

(58) Field of Classification Search
CPC ............ H04N 13/0495; H04N 13/0468; G06F 1/1652; G06F 3/04842; G09G 3/003; G09G 2300/023
See application file for complete search history.

(56) References Cited

U.S. PATENT DOCUMENTS

| | | | | |
|---|---|---|---|---|
| 6,721,023 B1* | 4/2004 | Weiss | ................. | G02B 27/2278 348/E13.005 |
| 8,665,236 B2 | 3/2014 | Myers | | |
| 9,116,567 B2* | 8/2015 | Alberth, Jr. | ........... | G06F 1/1694 |
| 2007/0009222 A1* | 1/2007 | Koo | ................... | H04N 13/0495 385/147 |
| 2010/0289819 A1* | 11/2010 | Singh | .................... | G09G 3/003 345/619 |
| 2013/0265221 A1 | 10/2013 | Lee et al. | | |

(Continued)

FOREIGN PATENT DOCUMENTS

KR 1020070006119 A 1/2007

OTHER PUBLICATIONS

Darren Quick, gizmag.com, "LG "rolls out" latest flexible and transparent OLED panels", Jul. 10, 2014, http://www.gizmag.com/lg-display-oled-transparent-flexible/32904/.

(Continued)

*Primary Examiner* — Patrick Edouard
*Assistant Examiner* — Maheen Javed
(74) *Attorney, Agent, or Firm* — Ronald A. Kaschak; Matthew M. Hulihan; Heslin Rothenberg Farley & Mesiti PC

(57) ABSTRACT

Multi-layer display of content on a flexible display is provided. A roll profile of a rolled transparent flexible display is detected, the rolled transparent flexible display forming a plurality of overlapping display layers of the transparent flexible display. Content is then displayed on the plurality of overlapping display layers, where different portions of the content are displayed on different display layers of the plurality of display layers to present the content as three-dimensional content.

16 Claims, 7 Drawing Sheets

(56) References Cited

U.S. PATENT DOCUMENTS

| | | | |
|---|---|---|---|
| 2013/0328764 A1 | 12/2013 | Chon et al. | |
| 2014/0145161 A1* | 5/2014 | Naijo | H01L 51/0097 |
| | | | 257/40 |
| 2014/0306908 A1* | 10/2014 | Nagaraju | G06F 3/0416 |
| | | | 345/173 |
| 2015/0220118 A1* | 8/2015 | Kwak | G06F 3/14 |
| | | | 345/667 |
| 2015/0279418 A1* | 10/2015 | Laksono | G11B 20/10527 |
| | | | 386/248 |
| 2016/0274676 A1* | 9/2016 | Jung | G06F 3/04883 |

OTHER PUBLICATIONS

Wetzstein et al., "Layered 3D: Tomographic Image Synthesis for Attenuation-based Light Field and High Dynamic Range Displays", http://alumni.media.mit.edu/~dlanman/research/Layered3D/.

Raskar et al., "Compressive Displays", http://alumni.media.mit.edu/~dlanman/research/compressivedisplays/.

"E Ink Launches New 32? ePaper Displays", the-ebook-reader.com, http://blog.the-ebook-reader.com/2014/06/11/e-ink-launches-new-32-epaper-displays/.

Sebastian Anthony, "LG's flexible and transparent OLED displays are the beginning of the e-paper revolution", Jul. 14, 2014, http://www.extremetech.com/computing/186241-lgs-flexible-and-transparent-oled-displays-are-the-beginning-of-the-e-paper-revolution.

* cited by examiner

MULTI-LAYER DISPLAY OF CONTENT ON A FLEXIBLE DISPLAY

BACKGROUND

Recent developments in display technology for use in/with mobile phones, tablets, televisions, laptops, and other electronic devices have yielded displays that are transparent while being flexible, bendable, and/or rollable. Such flexible displays may be made of "electronic paper" or a thin, flexible plastic substrate incorporating organic light emitting diode (OLED) technology, as examples. Meanwhile, multi-layer displays exist for displaying depth in presented images. This conveys a realistic three-dimensional appearance of the content. Example multi-layer displays include multiple transparent displays stacked over each other, where different 'layers' of an image or other content is then displayed in the different layers of the multi-layer display.

SUMMARY

Shortcomings of the prior art are overcome and additional advantages are provided through the provision of a computer-implemented method that includes detecting a roll profile of a rolled transparent flexible display, the rolled transparent flexible display forming a plurality of overlapping display layers of the transparent flexible display; and displaying content on the plurality of overlapping display layers, wherein different portions of the content are displayed on different display layers of the plurality of display layers to present the content as three-dimensional content.

Further, a computer system is provided that includes a memory and a processor in communications with the memory, wherein the computer system is configured to perform a method including: detecting a roll profile of a rolled transparent flexible display, the rolled transparent flexible display forming a plurality of overlapping display layers of the transparent flexible display; and displaying content on the plurality of overlapping display layers, wherein different portions of the content are displayed on different display layers of the plurality of display layers to present the content as three-dimensional content.

Yet further, a computer program product including a computer readable storage medium readable by a processor and storing instructions for execution by the processor is provided for performing a method that includes: detecting a roll profile of a rolled transparent flexible display, the rolled transparent flexible display forming a plurality of overlapping display layers of the transparent flexible display; and displaying content on the plurality of overlapping display layers, wherein different portions of the content are displayed on different display layers of the plurality of display layers to present the content as three-dimensional content.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described provide for multi-layer display functionality with a flexible transparent display. An advantage of a multi-layer display over other three-dimensional media technology is that it can impart a three-dimensional character to a digital object without using three-dimensional glasses. In specific embodiments, a rolled display (such as a large, flexible electronic paper "e-Paper" display) provides multi-layer display functionality. Based on a number of layers of the roll, content will be dynamically distributed across different layers to present the content with a three-dimensional appearance. By way of specific example, a user rolls a flexible transparent display and the number of layers thereby provided depends on characteristics of the roll, such as its curvature. When the user opens an image, video, or other content for display on the rolled display, the content is displayed in/across the different layers. Because the layers are at least partially transparent, the viewer is able to see the content across the layers. Software installed on the device with which the display communicates analyzes the content and determines a number of display layers on which to present the content with a three-dimensional appearance. In some examples, a roll profile is recommended to a user to indicate the curvature of a desired roll to achieve the appropriate layering. As an enhancement, the user can insert another rolled transparent display concentrically inside of the initial rolled display to increase the total number of overlapping layers on which the content can be presented.

Figure 1:
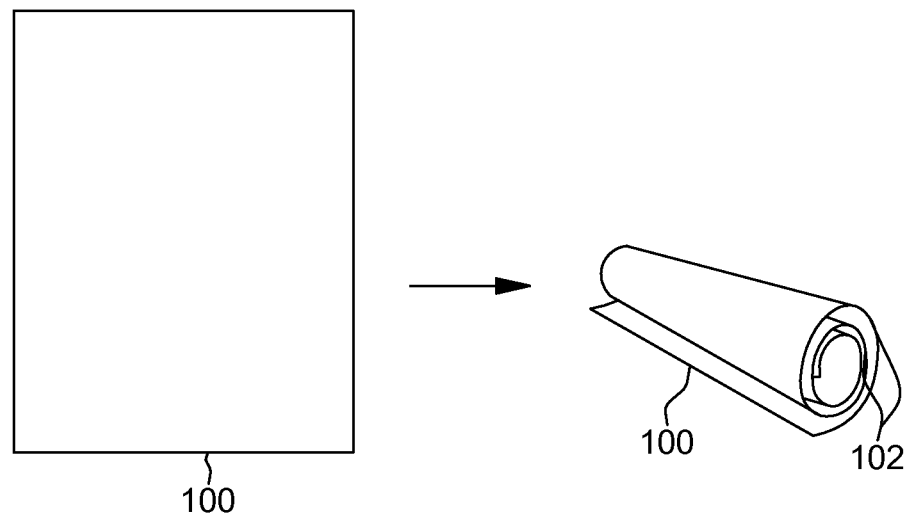
FIG. 1 depicts an example in which a transparent flexible display is rolled to form a cylindrical tube with multiple overlapping layers.

FIG. 1 depicts an example in which a transparent flexible display is rolled to form a cylindrical tube with multiple overlapping layers. A user obtains a transparent flexible display 100 having one or both sides being capable of displaying content. In the examples described herein, a single side of the flexible display is active, though aspects described herein apply to double-sided displays. Display 100 is part of, or in communication with, a computer system (not pictured). The user rolls the display 100 to form the cylindrical tube with multiple overlapping display layers 102. The display is (at least partially) transparent, so content presented on the inner layers is viewable through the outer layers. This provides the ability to present content across multiple layers, overlaid to create three-dimensional effects.

When a user or program opens media or other content for display, the system presents the content on/across different layers to provide the three-dimensional effect. The content might have been created to be displayed as three-dimension content, in which case configuration information is provided in/with the content that informs a system with a multi-layer display how to appropriately display the content to impart the three-dimensional effect. Typically this would involve identifying the portions of the content that are to be presented on each of the different layers and the positioning of those portions. Additionally or alternatively, the system can build the configuration information from content that was not explicitly created or provided with the intention of being presented on a three-dimensional display. The system can build the three-dimensional layering information from an ordinary video (or other content) using any of various techniques, for instance. In any case, the content might include or otherwise have associated therewith metadata that specifies a number of layers for displaying the content, which portions of the content belong on which layers, and any other information desired to facilitate presentation of the content across multiple display layers.

Figure 2:
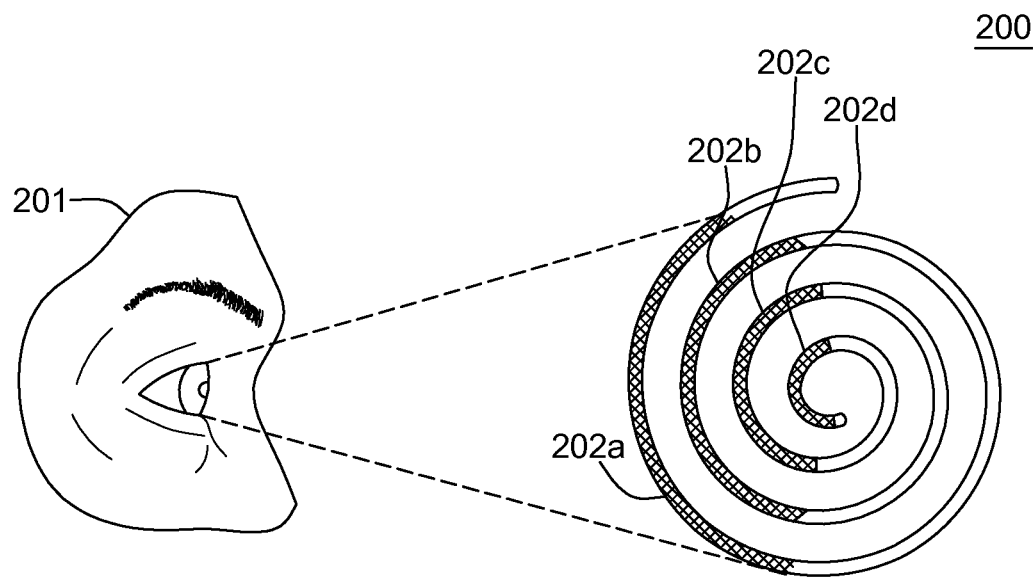
FIG. 2 illustrates an example of a user's viewing direction and corresponding viewable portions of the rolled transparent flexible display that are viewable from the viewing direction in accordance with aspects described herein.

FIG. 2 illustrates an example of a user's viewing direction and corresponding viewable portions of the rolled transparent flexible display that are viewable from the viewing direction, in accordance with aspects described herein. User 201 is shown viewing rolled display 200, which is oriented horizontally with respect to the user's line of sight and the user views the rolled display from the side. The rolling of the display coils the display to create multiple overlapping layers. Only some portions of the display are viewable to user 201 when the display is rolled. These viewable portions of the display are identified based on detecting the user's viewing direction. In the example of FIG. 2, portions 202a, 202b, 202c and 202d (with hashing) in consecutive layers depict the viewable portions of the rolled transparent display, i.e. the portions that are viewable from the viewing direction of user 201. If the user were to rotate the display about the center axis of the roll, different portions of the rolled display would become the portions that are viewable to the user. Also in FIG. 2, the rolled display is presented generally circular, though in some embodiments the rollable display is less rigid and naturally collapses into a flatter collection of overlapping layers. In yet other embodiments, the user intentionally squeezes or flattens the rolled display so that the multiple layers are more parallel to each other.

The user's viewing direction can be determined using any of a variety of techniques. In some examples, camera(s) on the ends of the display image the surrounding environment and the user's eye position is determined based on those images. Additionally or alternatively, proximity sensors can be used to ascertain the user's eye location. In a less complex approach, a marker or other indication indicates to the user the proper orientation of the screen and direction from which the user is to view the screen, and the user's viewing direction is assumed to be the direction indicated to the user.

The properties of the roll, including the number of layers, the curvature of one or more areas of the display, the spacing between layers, and any other desired information are collectively referred to herein as the 'roll profile'. Different content lends itself to display on rolls with different roll profiles. Content that is to be displayed across six layers can use a different roll profile than content that is displayed across only three layers. In the example of FIG. 1, the rolled transparent display provides three overlapping display layers from any viewing angle of the display, while in FIG. 2, the rolled display provides four, or in some places (e.g. looking from the right side of FIG. 2) three overlapping layers.

Figure 3:
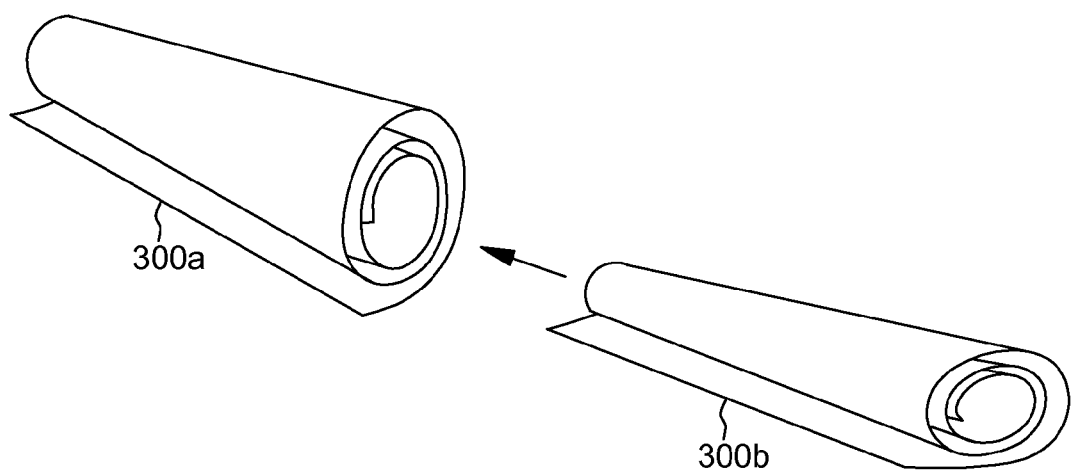
FIG. 3 depicts an example in which a rolled second transparent flexible display is inserted into a rolled first transparent flexible display to provide a set of overlapping layers of both displays, for displaying content in accordance with aspects described herein.

To accommodate content that necessitates more layers than can be comfortably provided by a single rolled display (i.e. without a prohibitively tight roll), a rolled second transparent flexible display can be inserted into a rolled first transparent flexible display to provide a set of overlapping layers of both displays, for displaying content in accordance with aspects described herein. An example is provided with reference to FIG. 3. Display 300a is rolled relatively loosely. Display 300b is rolled tighter and can therefore be inserted into the cylindrical tube formed by display 300a. This provides additional layers for the content to be cooperatively presented across a set of layers including layers from display 300a and layers from display 300b. Cameras, proximity sensors, or other sensors such as accelerometers can be used to determine orientations of displays 300a and 300b, and their orientation with respect to each other. Meanwhile, viewing direction can be determined as described above, and the computer system(s) that incorporate or use displays 300a and 300b can determine which content portions to display on the various overlapping layers of the displays to cooperatively present the content.

The following presents example implementation steps of aspects described herein. Initially, a user rolls the transparent flexible display. A computer system, such as one in which the flexible display is incorporated or that is in communication with the flexible display, determines a viewing direction from which a viewer views the rolled display. As noted, there are different methods for detecting such a viewing direction. In one example, one or more cameras integrated with the display or computer system are leveraged to track a viewer's facial direction and therefore viewing area/angle. An additional or alternative possibility is to use moving wireless-enabled camera(s) that can move between various locations in border-strip(s) of the flexible display. This technology would enable a reduction in the number of cameras to be incorporated with/attached to the display.

If multiple viewers are detected with different viewing directions, then different possibilities exist for displaying content on the rolled display. As one possibility, content is presented to cater to a single viewing direction—perhaps that of one of the viewers, or some 'in-between' or average viewing direction. As another possibility, such as when there are multiple viewers viewing various sides of the roll, then heuristics can be applied to decide on a viewing direction for which to present content. As a simple example, the side of the roll with the greatest number of viewers is selected. Alternatively, the side being viewed by a primary user (based on facial recognition) may be selected. In a scenario where viewers view opposite sides of the rolled display and have different viewable portions thereof, the same or different content can be presented for each user. This is made possible because only some of the active portion of the display is being used/view by each viewer (refer to the description of FIG. 2 supra and FIG. 4 infra).

Figure 4:
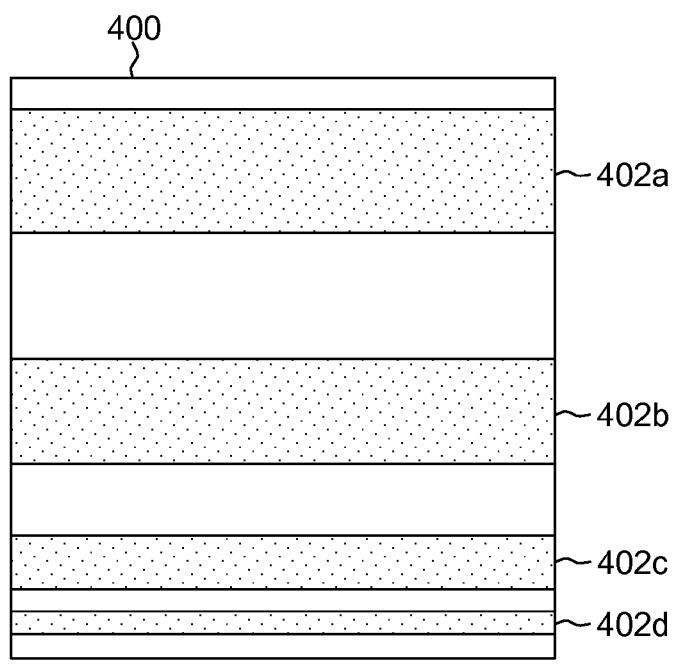
FIG. 4 illustrates an unrolled example of the display of FIG. 2 showing the viewable portions viewable from the viewing direction, in accordance with aspects described herein.

Based on detecting the selection of content for display, such as when the user opens content, software installed in the device will analyze the content and determine a recommended appropriate number of layers and/or radii of curvature for each layer to present the content with an appropriate, e.g. optimal, three-dimensional appearance. A recommended roll profile is determined based on this and indicated to the user. Based on the viewing direction(s) and the radii of roll, software can also identify the display portion(s) of the transparent display that will be presenting the content portions. This is illustrated by way of FIG. 4, illustrating an unrolled example of the display of FIG. 2 showing the viewable portions viewable from the user's viewing direction, in accordance with aspects described herein. Display 400 is shown in its unrolled form. Portions 404a, 404b, 404c and 404d represent the portions of display 400 that are viewable to user 201, corresponding to a respective layer of the rolled display. Areas in between portions 404a, 404b, 404c and 404d represent portions that are not viewable to user 201 and therefore may be left blank or filled with appropriate background color(s)/pattern(s) to compliment the content being presented on the viewable portions. Portions 404a, 404b, 404c and 404d correspond to portions 202a, 202b, 202c and 202d of FIG. 2. It is seen from FIGS. 2 and 4 that the viewable portions of the outer layers are larger than the viewable portions of the inner layers. It is also seen that the spacing between viewable portions decreases moving from the outer layers to inner layers. In the event there are two viewers of the rolled display of FIG. 2—a first viewer from the left side as indicated in FIG. 2 and a second viewer from the opposite side—then the same or different content can be displayed in the portions viewable to the second user, i.e. the areas in between/around 402a-402d in FIG. 4.

Software can also dynamically change the display portions when there is a change in the view direction and/or roll profile of the display. In such a case, the positioning, number, thickness, and/or spacing of the viewable portions may be dynamically adjusted according to the change in view direction and/or roll profile.

A user might initially roll the transparent display relatively tightly, to a minimum extent possible for instance (which provides the greatest number of layers). The user can then loosen his/her grip or otherwise allow the display to unroll to an extent necessary to satisfy the recommended roll profile for the content. This can be accomplished by the user releasing some pressure applied to the display, such as by letting go of the display or loosening the user's grip on the rolled display. The display may then naturally unravel to some extent toward its original (e.g. flat) form. The system can provide visual, audio, or other feedback to the user to indicate that the desired roll profile has or has not been satisfied. Unrolling, unraveling, or loosening of the rolled display changes the radii of curvature and the number of layers. Software can track these changes using sensors including stress sensors, cameras, and/or proximity sensors. Based on the bending stress, radii of the curvature at various areas of the display are determined and accordingly a number of layers of the roll can be identified. When the preferred roll profile (radii of curvature and/or number of layers) is satisfied, software can indicate to the user that unraveling of the rolled display is to halt. The user can then grip, press, or otherwise cause the display to stop further unrolling, Software can use this approach to assist an end-user in providing the desired roll profile for particular three-dimensional content.

Based on the view angle(s), software can determine the area of the viewable portion of the top (outermost) layer of the rolled display. Viewable portions of subsequent layers can be identified, and then the system can plot the different content portions of the content on the viewable portions of the different layers of the rolled device to present three-dimensional objects when the user views the rolled display. The software does this by correlating the layers of the content to the different layers of the rolled transparent display to impart the three-dimensional character when viewing the layers.

The user can insert another rolled display into the initial rolled display to increase the number of layers, if desired. This increases the total number of overlapping layers on which content can be presented. The system can dynamically identify the number of layers, and according display the content across some or all of them. As described above, device-to-device communication enables the displays or their underlying computer system(s) to communicate that the devices are near each other. The system can identify which display is the inner display based on sensing radii of curvature of the displays. Signals from the outside device can identify the user viewing angle(s) and communicate this to the inner display (or its underlying computer system).

As described herein, a transparent flexible display is provided for multi-layer display functionality. Rolling such a display forms multiple overlapping display layers. An appropriate roll profile is determined. Content analysis identifies the different layers to the content and content portions are displayed across the overlapping layers created by the rolling.

Figure 5A:
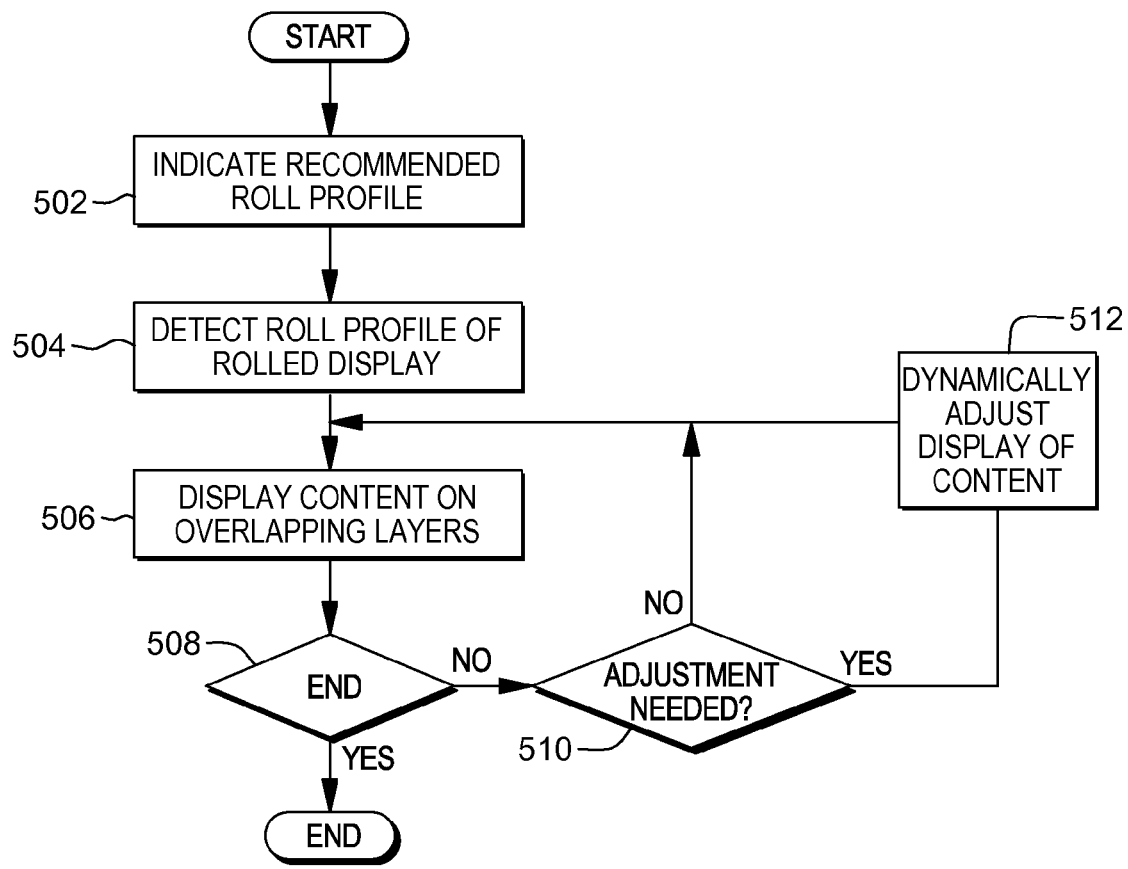
FIGS. 5A-5C depict example processes for multi-layer display of content on a flexible display, in accordance with aspects described herein.
Figure 5B:
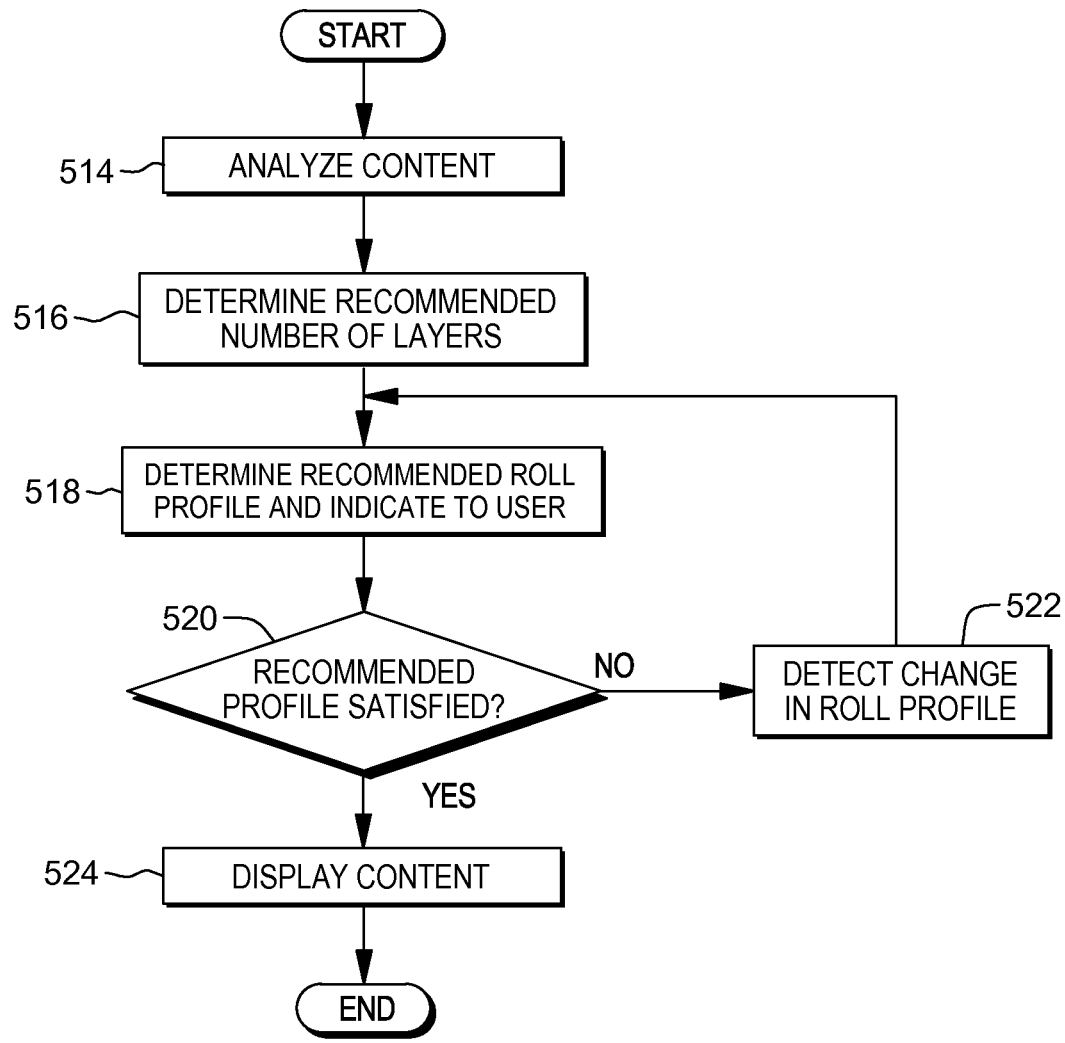
Figure 5C:
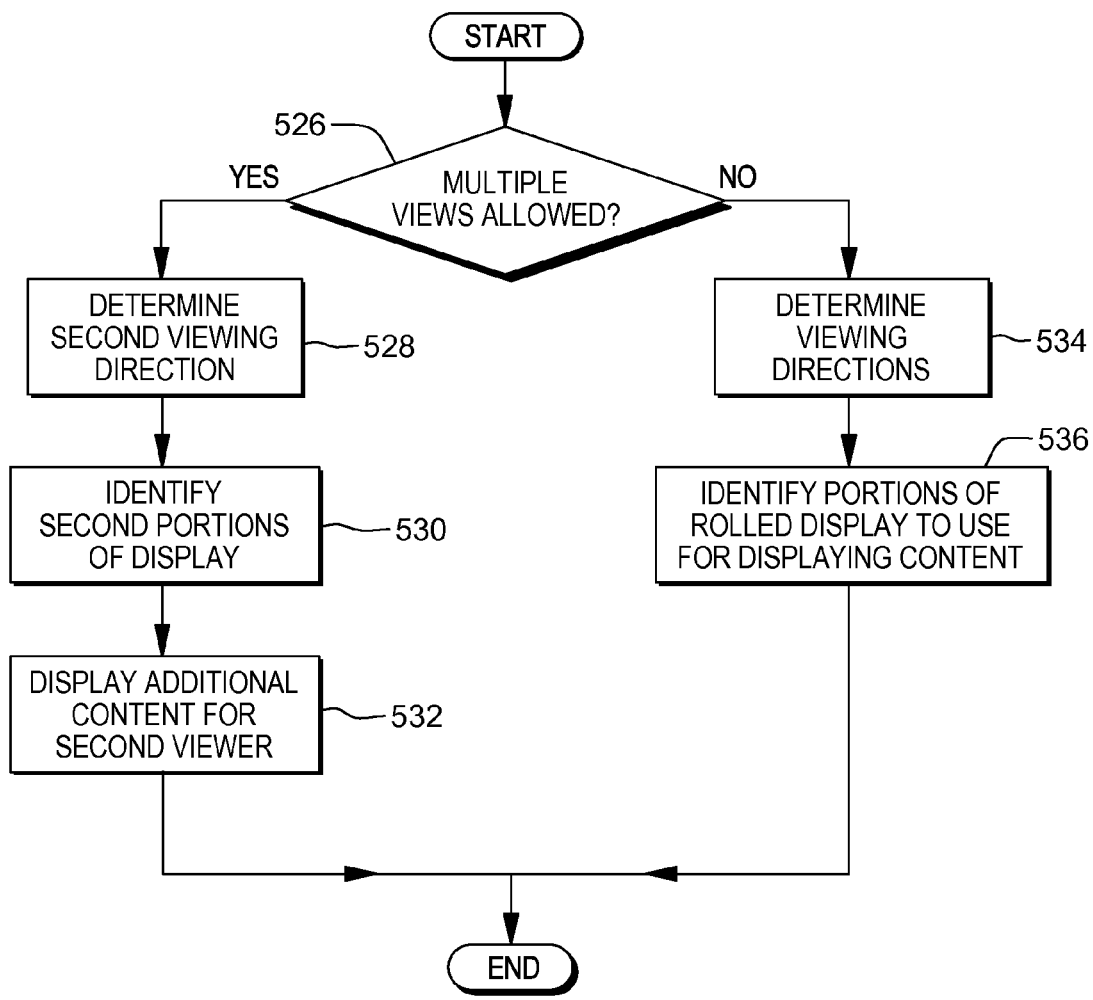

Accordingly, aspects described herein provide processes for multi-layer display of content on a transparent flexible display, examples of which are depicted and described with reference to FIGS. 5A-5C. One or more processes may be performed by one or more computers system having, using, or being in communication with one or more flexible display devices.

Initially, a recommended roll profile for the transparent flexible display may optionally be indicated to a user (502). This recommended roll profile may be based on a recommended number of overlapping display layers on which selected content is to be displayed. The recommended roll profile can indicate a curvature of the transparent flexible display to achieve the recommended number of display layers. In any case, the process continues by detecting a roll profile of the rolled transparent flexible display (504). The rolled transparent flexible display forms a plurality of overlapping display layers of the transparent flexible display. Then, content is displayed on the plurality of overlapping display layers (506), for example different portions of the content are displayed on different display layers of the plurality of display layers to present the content as three-dimensional content. In an example where the recommended roll profile was indicated to the user the displaying of the content on the plurality of overlapping display layers may be performed based on determining that the detected roll profile of the transparent flexible display satisfies the recommended roll profile. Further details of this are provided below with reference to FIG. 5B. As part of displaying the content on the overlapping layers, a viewing direction from which a viewer views the rolled transparent flexible display may be determined, and portions of the rolled transparent flexible display viewable from the viewing direction may be identified. The identified portions viewable from the viewing direction may then be used as the plurality of overlapping display layers on which the content is displayed.

The process continues by determining whether to end (508). It may be determined to end when the content is no longer to be displayed (for example the content is a video that ends, the user switches to other content for display, etc.). Assuming it is determined not to end, then the process determines whether a dynamic adjustment is needed (510). In this regard, the display of the content can initially display the content on first portions of the transparent flexible display that are viewable from a viewing direction of a viewer. Based on any of various events, it may be determined that a dynamic adjustment of the display of the content is needed to display the content on second portions of the transparent flexible display different from the first portions. Examples include detecting at least one of (i) a change in viewing direction of the viewer, or (ii) a change in the roll profile of the rolled transparent flexible display. If at (510) it is determined that such a dynamic adjustment is needed, then the process dynamically adjusts the display of the content (512) to display the content on different portions that initially used to display the content. Otherwise, the process skips (512) and continues to display the content (506) absent the adjustment.

The rolled transparent flexible display can forms a cylindrical (or otherwise hollow) tube. As an enhancement, another transparent flexible display can be introduced to expand the total number of display layers for use in displaying the content. Thus, the initial transparent flexible display may be a first transparent flexible display, and the process may further include detecting insertion of a rolled second transparent flexible display into the cylindrical tube formed by the first transparent flexible display. The rolled second transparent flexible display forms overlapping display layers of the second transparent flexible display, and the insertion provides a set of overlapping layers, the set including the overlapping display layers of the first transparent flexible display and the overlapping display layers of the second transparent flexible display. The content can then be displayed on at least some of the set of overlapping layers, where different portions of the content are displayed on different layers of the overlapping display layers of the first transparent flexible display and the overlapping display layers of the second transparent flexible display to present the content as three-dimensional content.

FIG. 4B depicts an example process for recommending and detecting a roll profile, in accordance with aspects described herein. Based on a selection of content for display, which may be a user-selection or an automated selection by the computer system(s), the process begins by analyzing the content (514) and determining a recommended number of overlapping display layers (516). The recommended number of overlapping layers may be dictated in data included with the content, or it may be determined by the computer system(s) based on analyzing features of the content, as examples. Based on the recommended number of overlapping display layers, a recommended roll profile is determined and indicated to the user (518).

It is then determined whether the detected roll profile (the one that the system detects is currently being applied to the display) satisfies the recommended roll profile (520). If the recommended roll profile is not satisfied, the user can adjust the roll profile of the display. This is detected (522) and the process returns to (520) to determine whether the changed roll profile now satisfies the recommended roll profile. Thus, a loop is entered in which the system can check whether the user's adjustments to the roll profile of the display satisfy the roll profile needed to display the content. During this, the system can provide feedback to the user to indicate what is needed to satisfy the roll profile and/or whether the roll profile is satisfied. When it is determined that the changed roll profile satisfies the recommended roll profile, the process continues performing the displaying of the content (524).

Some situations involve multiple viewers viewing the rolled transparent flexible display from the same, similar, or very different viewing angles. FIG. 4C depicts an example process for handling multiple viewers, in accordance with aspects described herein. Initially it is determined whether there are multiple views from different viewing angles allowed (526). If so, different viewers are allowed to view the same or different content on portions of the screen that are visible to them. In this event, the initial viewing direction is a first viewing direction, the viewer is a first viewer, and the identified portions of the rolled transparent flexible display viewable from the viewing direction are first portions of the rolled transparent flexible display. The process then determines a second viewing direction (528) from which a second viewer views the rolled transparent flexible display, the second viewing direction being a different viewing direction from the first viewing direction. Second portions of the rolled transparent flexible display are identified based on this (530), the second portions being viewable from the second viewing direction and being different from the identified first portions of the rolled transparent flexible display, and the second portions forming different overlapping display layers from the plurality of overlapping display layers. Additional content is then displayed for the second viewer (532) on these second display portions to present the additional content as three-dimensional content for view by the second viewer. The additional content may be the same or different content as the content displayed on the first portions of the rolled transparent flexible display for the first viewer.

Alternatively, if it is determined at (526) that multiple views are not allowed, then a plurality of viewing directions from which a plurality of viewers view the rolled transparent flexible display are determined (534). Based on those viewing directions, the process identifies portions of the rolled transparent flexible display to use as the plurality of overlapping display layers on which the content is displayed (536). Identifying those portions can be done using any desired technique. In a specific example, facial recognition is used to determine a viewing direction of a primary viewer, where the identified portions are portions viewable from the viewing direction of the primary viewer.

Processes described herein may be performed singly or collectively by one or more computer systems, such as computer system(s) described below with reference to FIG. 6. In some examples, such a computer system that performs process(es) described herein is a computer system that is part of, includes, or uses one or more flexible display devices. In other examples, a remote computer system in communication with such computer system performs process(es) described herein. As a third possibility, a combination of the (i) computer system including/using the one or more flexible display devices and (ii) remote computing system(s) perform process(es) described herein.

Figure 6:
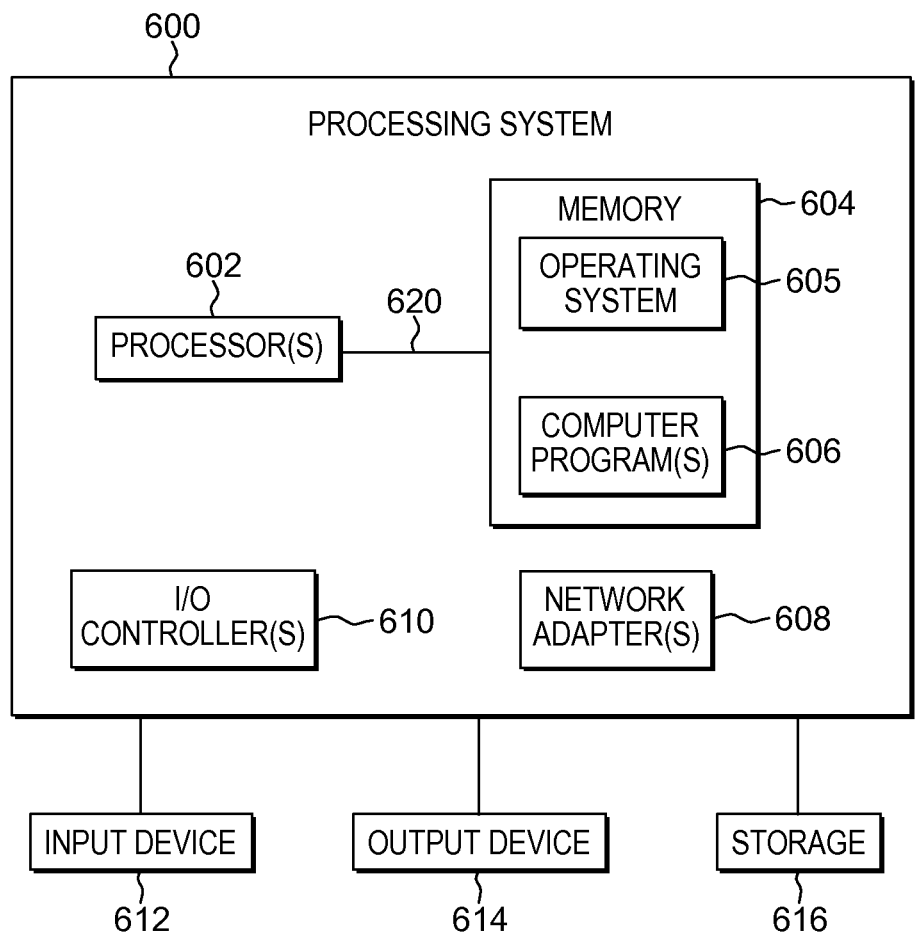
FIG. 6 depicts an example of a computer system to incorporate and use aspects described herein.

FIG. 6 depicts one example of a computer system to incorporate and use aspects described herein. A computer system may also be referred to herein as a processing device/system or computing device/system, or simply a computer. Computer system 600 may be based on one or more of various system architectures such as those offered by International Business Machines Corporation (Armonk, N.Y., USA) or Intel Corporation (Santa Clara, Calif., USA), as examples.

Computer system 600 is suitable for storing and/or executing program code and includes at least one processor 602 coupled directly or indirectly to memory 604 through, e.g., a system bus 620. In operation, processor(s) 602 obtain from memory 604 one or more instructions for execution by the processors. Memory 604 may include local memory employed during actual execution of the program code, bulk storage, and cache memories which provide temporary storage of at least some program code in order to reduce the number of times code must be retrieved from bulk storage during program code execution. A non-limiting list of examples of memory 604 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 604 includes an operating system 605 and one or more computer programs 606, for instance programs to perform aspects described herein.

Input/Output (I/O) devices 612, 614 (including but not limited to displays, such as transparent flexible displays, microphones, speakers, accelerometers, gyroscopes, magnetometers, light sensors, proximity sensors, GPS devices, cameras, etc.) may be coupled to the system either directly or through I/O controllers 610.

Network adapters 608 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 608 used in computer system.

Computer system 600 may be coupled to storage 616 (e.g., a non-volatile storage area, such as magnetic disk drives, optical disk drives, a tape drive, etc.), having one or more databases. Storage 616 may include an internal storage device or an attached or network accessible storage. Computer programs in storage 616 may be loaded into memory 604 and executed by a processor 602 in a manner known in the art.

The computer system 600 may include fewer components than illustrated, additional components not illustrated herein, or some combination of the components illustrated and additional components. Computer system 600 may include any computing device known in the art, such as a mainframe, server, personal computer, workstation, laptop, handheld or mobile computer, tablet, wearable device, telephony device, network appliance, virtualization device, storage controller, etc.

Figure 7:
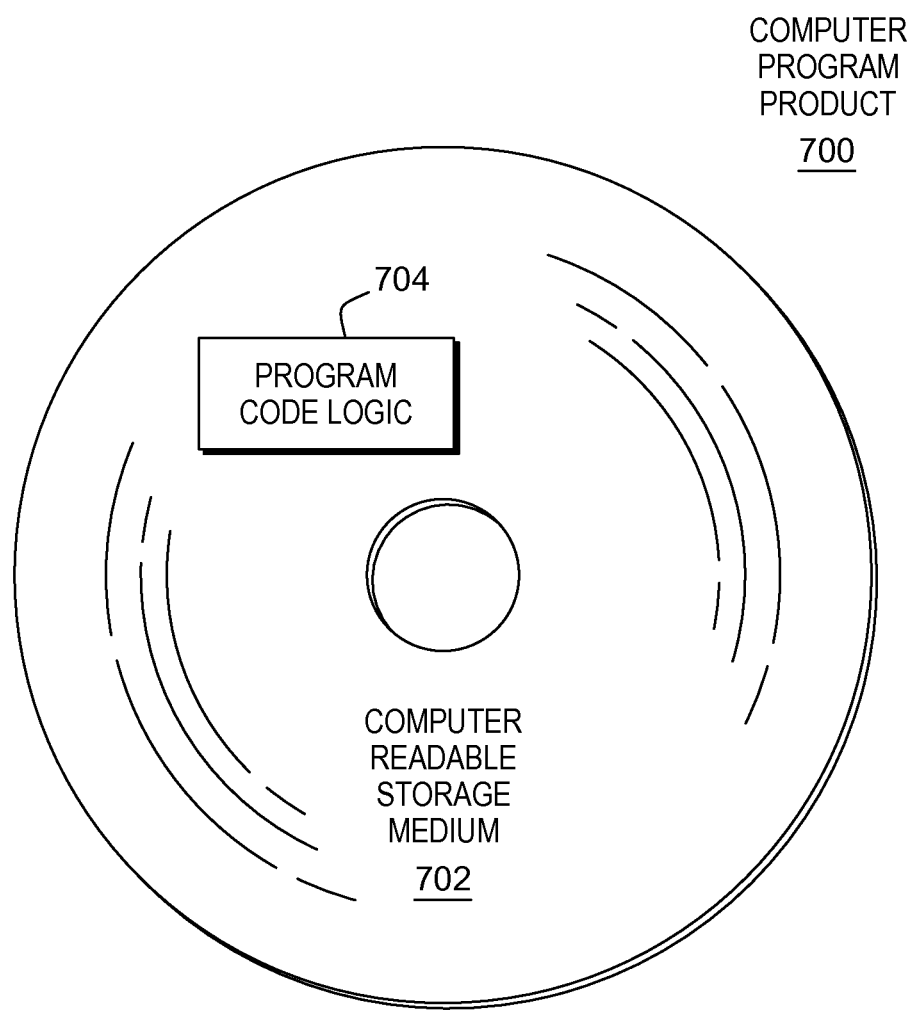
FIG. 7 depicts one embodiment of a computer program product.

Referring to FIG. 7, in one example, a computer program product 700 includes, for instance, one or more computer readable storage media 702 to store computer readable program code means, logic and/or instructions 704 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
indicating to a user a recommended roll profile for a transparent flexible display based on a recommended number of overlapping display layers on which content is to be displayed, the recommended roll profile indicating a curvature of the transparent flexible display to achieve the recommended number of display layers;
detecting a roll profile of the transparent flexible display, the transparent flexible display being rolled and forming a plurality of overlapping display layers of the transparent flexible display; and
based on determining that the detected roll profile of the transparent flexible display satisfies the recommended roll profile, displaying the content on the plurality of overlapping display layers, wherein different portions of the content are displayed on different display layers of the plurality of display layers to present the content as three-dimensional content.

2. The method of claim 1, further comprising:
based on a user selection of the content for display, analyzing the content and determining the recommended number of overlapping display layers;
determining the recommended roll profile based on the recommended number of overlapping display layers; and
indicating to the user the recommended roll profile.

3. The method of claim 2, wherein initially the detected roll profile fails to satisfy the recommended roll profile, and wherein the method further comprises:
based on the indicating, detecting a changed roll profile of the transparent flexible display;
determining that the changed roll profile satisfies the recommended roll profile; and
performing the displaying based on determining that the changed roll profile satisfies the recommended roll profile.

4. The method of claim 1, further comprising:
determining a viewing direction from which a viewer views the rolled transparent flexible display;
identifying portions of the rolled transparent flexible display viewable from the viewing direction; and
using the portions viewable from the viewing direction as the plurality of overlapping display layers on which the content is displayed.

5. The method of claim 4, wherein the viewing direction is a first viewing direction, the viewer is a first viewer, and the identified portions are first portions of the rolled transparent flexible display, and wherein the method further comprises:
determining a second viewing direction from which a second viewer views the rolled transparent flexible display, the second viewing direction being a different viewing direction from the first viewing direction;
identifying second portions of the rolled transparent flexible display, the second portions being viewable from the second viewing direction and being different from the identified first portions of the rolled transparent flexible display, and the second portions forming different overlapping display layers from the plurality of overlapping display layers; and
displaying additional content on the second display portions to present the additional content as three-dimensional content for view by the second viewer, wherein the additional content is the same as the content displayed on the first portions of the rolled transparent flexible display for the first viewer or is different from the content displayed on the first portions of the rolled transparent flexible display for the first viewer.

6. The method of claim 1, wherein the rolled transparent flexible display forms a cylindrical tube, wherein the transparent flexible display is a first transparent flexible display, and wherein the method further comprises:
   detecting insertion of a rolled second transparent flexible display into the cylindrical tube formed by the first transparent flexible display, the rolled second transparent flexible display forming overlapping display layers of the second transparent flexible display, wherein the insertion provides a set of overlapping layers comprising the overlapping display layers of the first transparent flexible display and the overlapping display layers of the second transparent flexible display; and
   displaying the content on the set of overlapping layers, wherein different portions of the content are displayed on different layers of the overlapping display layers of the first transparent flexible display and the overlapping display layers of the second transparent flexible display to present the content as three-dimensional content.

7. The method of claim 1, further comprising:
   determining a plurality of viewing directions from which a plurality of viewers view the rolled transparent flexible display; and
   identifying, based on the plurality of viewing directions, portions of the rolled transparent flexible display to use as the plurality of overlapping display layers on which the content is displayed.

8. The method of claim 7, wherein the identifying comprises using facial recognition to determine a viewing direction of a primary viewer, wherein the identified portions comprises portions viewable from the viewing direction of the primary viewer.

9. The method of claim 1, wherein the displaying the content initially displays the content on first portions of the transparent flexible display that are viewable from a viewing direction of a viewer, and wherein the method further comprises dynamically adjusting the display of the content to display the content on second portions of the transparent flexible display different from the first portions, the dynamically adjusting being based on detecting at least one of (i) a change in viewing direction of the viewer, or (ii) a change in the roll profile of the rolled transparent flexible display.

10. A computer system comprising:
   a memory; and
   a processor in communications with the memory, wherein the computer system is configured to perform a method, the method comprising:
      indicating to a user a recommended roll profile for a transparent flexible display based on a recommended number of overlapping display layers on which content is to be displayed, the recommended roll profile indicating a curvature of the transparent flexible display to achieve the recommended number of display layers;
      detecting a roll profile of the transparent flexible display, the transparent flexible display being rolled and forming a plurality of overlapping display layers of the transparent flexible display; and
      based on determining that the detected roll profile of the transparent flexible display satisfies the recommended roll profile, displaying the content on the plurality of overlapping display layers, wherein different portions of the content are displayed on different display layers of the plurality of display layers to present the content as three-dimensional content.

11. The computer system of claim 10, wherein the rolled transparent flexible display forms a cylindrical tube, wherein the transparent flexible display is a first transparent flexible display, and wherein the method further comprises:
   detecting insertion of a rolled second transparent flexible display into the cylindrical tube formed by the first transparent flexible display, the rolled second transparent flexible display forming overlapping display layers of the second transparent flexible display, wherein the insertion provides a set of overlapping layers comprising the overlapping display layers of the first transparent flexible display and the overlapping display layers of the second transparent flexible display; and
   displaying the content on the set of overlapping layers, wherein different portions of the content are displayed on different layers of the overlapping display layers of the first transparent flexible display and the overlapping display layers of the second transparent flexible display to present the content as three-dimensional content.

12. The computer system of claim 10, wherein the method further comprises:
   determining a viewing direction from which a viewer views the rolled transparent flexible display;
   identifying portions of the rolled transparent flexible display viewable from the viewing direction; and
   using the portions viewable from the viewing direction as the plurality of overlapping display layers on which the content is displayed.

13. The computer system of claim 10, wherein the method further comprises:
   determining a plurality of viewing directions from which a plurality of viewers view the rolled transparent flexible display; and
   identifying, based on the plurality of viewing directions, portions of the rolled transparent flexible display to use as the plurality of overlapping display layers on which the content is displayed.

14. The computer system of claim 10, wherein the displaying the content initially displays the content on first portions of the transparent flexible display that are viewable from a viewing direction of a viewer, and wherein the method further comprises dynamically adjusting the display of the content to display the content on second portions of the transparent flexible display different from the first portions, the dynamically adjusting being based on detecting at least one of (i) a change in viewing direction of the viewer, or (ii) a change in the roll profile of the rolled transparent flexible display.

15. A computer program product comprising:
   a non-transitory computer readable storage medium readable by a processor and storing instructions for execution by the processor for performing a method comprising:
      indicating to a user a recommended roll profile for a transparent flexible display based on a recommended number of overlapping display layers on which content is to be displayed, the recommended roll profile indicating a curvature of the transparent flexible display to achieve the recommended number of display layers;
      detecting a roll profile of the transparent flexible display, the transparent flexible display being rolled and forming a plurality of overlapping display layers of the transparent flexible display; and
      based on determining that the detected roll profile of the transparent flexible display satisfies the recommended roll profile, displaying the content on the plurality of overlapping display layers, wherein different portions of the content are displayed on different display layers of the plurality of display layers to present the content as three-dimensional content.

16. The computer program product of claim 15, wherein the rolled transparent flexible display forms a cylindrical tube, wherein the transparent flexible display is a first transparent flexible display, and wherein the method further comprises:

detecting insertion of a rolled second transparent flexible display into the cylindrical tube formed by the first transparent flexible display, the rolled second transparent flexible display forming overlapping display layers of the second transparent flexible display, wherein the insertion provides a set of overlapping layers comprising the overlapping display layers of the first transparent flexible display and the overlapping display layers of the second transparent flexible display; and displaying the content on the set of overlapping layers, wherein different portions of the content are displayed on different layers of the overlapping display layers of the first transparent flexible display and the overlapping display layers of the second transparent flexible display to present the content as three-dimensional content.

* * * * *